(12) United States Patent
Kim et al.

(10) Patent No.: US 8,987,398 B2
(45) Date of Patent: Mar. 24, 2015

(54) ETHYLENE-BASED TERPOLYMER HAVING HIGH ELASTICITY AND PREPARATION METHOD THEREOF

(71) Applicant: Korea Institute of Industrial Technology, Cheonan-si, Chungcheongnam-do (KR)

(72) Inventors: Dong Hyun Kim, Gunpo-si (KR); Joon Chul Lee, Hwaseong-si (KR); Hyun Ki Kim, Tongyeong-si (KR); Tae Wan Kim, Cheonan-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 0 days.

(21) Appl. No.: 13/646,350

(22) Filed: Oct. 5, 2012

(65) Prior Publication Data

US 2013/0096269 A1 Apr. 18, 2013

(30) Foreign Application Priority Data

Oct. 18, 2011 (KR) .................... 10-2011-0106594

(51) Int. Cl.
| | |
|---|---|
| *C08F 210/16* | (2006.01) |
| *C08F 4/642* | (2006.01) |
| *C08F 4/6592* | (2006.01) |
| *C08F 4/659* | (2006.01) |

(52) U.S. Cl.
CPC ............ *C08F 210/16* (2013.01); *C08F 4/65908* (2013.01); *C08F 4/65912* (2013.01); *C08F 4/65927* (2013.01); *Y10S 526/943* (2013.01)
USPC ........ 526/347; 526/160; 526/165; 526/347.1; 526/348; 526/348.2; 526/943

(58) Field of Classification Search
CPC ... C08F 210/16; C08F 4/65912; C08F 4/6592
USPC ........... 526/160, 165, 347, 347.1, 348, 348.2, 526/943
See application file for complete search history.

(56) References Cited

U.S. PATENT DOCUMENTS

| | | | | |
|---|---|---|---|---|
| 6,015,862 | A | * | 1/2000 | Chung et al. .................. 525/320 |
| 6,265,493 | B1 | | 7/2001 | Chung et al. | |

* cited by examiner

*Primary Examiner* — Caixia Lu
(74) *Attorney, Agent, or Firm* — Seed IP Law Group PLLC

(57) ABSTRACT

The present invention relates to an ethylene-based terpolymer having high elasticity and a preparation method thereof, and more particularly, to a highly elastic, ethylene-based terpolymer, which comprises a specific molar ratio of a ethylene unit, a $C_{6-12}$ α-olefin unit and at least one functional unit selected from the group consisting of divinylbenzene and para-methylstyrene and to a method of preparing the highly elastic, ethylene-based terpolymer using a metallocene catalyst.

10 Claims, No Drawings

ETHYLENE-BASED TERPOLYMER HAVING HIGH ELASTICITY AND PREPARATION METHOD THEREOF

TECHNICAL FIELD

The present invention relates to an ethylene-based terpolymer having high elasticity and a preparation method thereof; and more particularly, to a highly elastic, ethylene-based terpolymer, which comprises a specific molar ratio of a ethylene unit, a $C_{6-12}$ α-olefin unit and at least one functional unit selected from the group consisting of divinylbenzene and para-methylstyrene and to a method of preparing the highly elastic, ethylene-based terpolymer using a metallocene catalyst.

BACKGROUOND ART

Polyolefins such as polyethylene (PE) and polypropylene (PP) are lightweight and cheap and have excellent physical properties and processability. Due to such advantages, these polyolefins are used in a wide range of fields, including food packages, clothes, containers for medical and cosmetic applications, automobile parts, communication and electrical device parts, engineering and construction materials, agricultural materials, and medical devices, and occupy a very important position as general-purpose resins. However, in recent years, demand for physical properties of polyolefins has been diversified, and there has been a need for polyolefins having properties absent in existing polyolefins. Examples of such polyolefins include polyolefins having excellent heat resistance, polyolefins having a soft feel similar to that of soft polyvinyl chloride, and polyolefins having high functions such as printability, coating properties, adhesiveness and compatibility with other polar polymers.

Ethylene-based copolymers are originally non-polar materials which generally have no polar group in the molecule, and thus have insufficient adhesion to highly polar materials such as metals or polar resins.

For this reason, when an ethylene-based copolymer is to be bonded to a highly polar material, the surface of the ethylene-based copolymer needs to be subjected to treatment, such as flame treatment, primer treatment or corona discharge treatment, which causes a problem of complicated operation.

The term "metallocene compound" refers to a group 4 transition metal compound having one or two cyclopentadienyl groups as ligands. The metallocene compound can be used as a catalyst for olefin polymerization after activation with a methylaluminoxane or boron compound so that it can be used as a catalyst for olefin polymerization. Because this metallocene catalyst advantageously has uniform active sites, a polymer prepared using the metallocene catalyst has a narrow molecular weight distribution, and copolymerization of monomers is easy, and also the distribution of the second monomer is uniform. In the case of propylene polymerization, the steric structure of the polymer can be controlled according to the symmetry of the catalyst. Particularly, a conventional Ziegler-Natta catalyst enables the preparation of only isotactic polypropylene, but the use of metallocene catalysts enables the preparation of various stereoregular polypropylenes, including isotactic, syndiotactic, atactic and hemiisotactic polypropylenes. For example, a syndiotactic polypropylene synthesized using a metallocene catalyst has characteristics of low crystallinity, suitable rigidity and hardness, good transparency and high impact resistance.

Such metallocene catalysts are actively being used for the production of LLDPE, VLDPE, EPM and EPDM copolymers, which are copolymers of ethylene and alpha-olefin, and cycloolefin copolymers (COCs) which are ethylene/cycloolefin or alpha-olefin/cycloolefin copolymers, as well as copolymers of ethylene, alpha-olefin and styrene. Catalysts for the production of such polymer products are commonly required to have good activity and good reactivity with the second monomer and to be able to make a polymer in which the distribution of the second monomer is uniform.

Meanwhile, because metallocene catalysts are costly compared to conventional Ziegler-Natta catalysts, they should have good activity so that they are economically valuable. Particularly, a metallocene catalyst having good reactivity with the second monomer has an advantage in that it makes it possible to obtain a polymer having a high content of the second monomer, even when the second monomer is introduced in small amounts.

Accordingly, the present inventors have conducted studies in view of the above respects and have found that, when a specific molar ratio of an ethylene monomer, a $C_{6-12}$ α-olefin monomer and at least one functional monomer selected from the group consisting of divinylbenzene and para-methylstyrene are polymerized using a metallocene catalyst, a highly elastic, ethylene-based terpolymer having a high weight-average molecular weight and a low glass transition temperature can be prepared, thereby completing the present invention.

DISCLOSURE

Technical Problem

It is an object of the present invention to provide a highly elastic, ethylene-based terpolymer having a high weight-average molecular weight and a low glass transition temperature, the ethylene-based terpolymer comprising a specific molar ratio of an ethylene unit, a $C_{6-12}$ α-olefin unit and a functional unit.

Another object of the present invention is to provide a method for preparing the above highly elastic, ethylene-based terpolymer.

Technical Solution

In order to accomplish the above objects, the present invention provides a highly elastic, ethylene-based terpolymer comprising 60-95 mole % of an ethylene unit, 3-35 mole % of a $C_{6-12}$ α-olefin unit, and 0.5-5 mole % of at least one functional unit selected from the group consisting of divinylbenzene and para-methylstyrene, the ethylene-based terpolymer having a weight-average molecular weight of 50,000-200,000 and a glass transition temperature between −20° C. and −60° C.

Examples of the $C_{6-12}$ α-olefin unit which is used in the present invention include, but are not limited to, hexene, heptene, octene and the like.

In the present invention, the at least one functional unit selected from the group consisting of divinylbenzene and para-methylstyrene functions as a reactive site by which a chain capable of imparting additional functionality may be introduced and grafted into the main chain of the highly elastic, ethylene-based terpolymer of the present invention.

In the present invention, if the ethylene unit is used in an amount of less than 60 mole %, it will be difficult to achieve polymerization using the metallocene catalyst, and if the ethylene unit is used in an amount of more than 95 mole %, the resulting terpolymer will show physical properties similar to those of pure polyethylene.

In the present invention, if the $C_{6-12}$ α-olefin unit is used in an amount of less than 3 mole %, the resulting terpolymer will have low elasticity because the content of the comonomer is low, and if the content of the α-olefin unit is used in an amount of more than 35 mole %, the resulting terpolymer will have significantly reduced mechanical strength so that the range of application thereof will be limited.

In the present invention, if the at least one functional unit selected from the group consisting of divinylbenzene and para-methylstyrene is used in an amount of less than 0.5 mole %, sites into which a functional group may be introduced will be reduced, making it difficult to make a highly functional material from the terpolymer. On the other hand, if the functional unit is used in an amount of more than 5 mole %, the activity of the catalyst will greatly decrease and the molecular weight of the resulting terpolymer will decrease. In other words, if the functional unit is used in an amount of more than 5 mole %, the activity of the catalyst will greatly decrease so that the efficiency of preparation of the terpolymer will be very low, and the molecular weight of the resulting terpolymer will decrease so that the physical properties thereof become poor. For these reasons, the amount of the functional unit is an important factor that should be suitably controlled to improve the efficiency of preparation of the highly elastic, ethylene-based terpolymer and the properties of the terpolymer.

Preferably, the terpolymer of the present invention comprises 80-95 mole % of the ethylene unit, 4-18 mole % of the $C_{6-12}$ α-olefin unit, and 0.5-2 mole % of the at least one functional unit selected from the group consisting of divinylbenzene and para-methylstyrene. In a specific embodiment, the terpolymer of the present invention comprises 81-95 mole % of the ethylene unit, 4.1-17.8 mole % of the $C_{6-12}$ α-olefin unit and 0.7-1.2 mole % of the at least one functional unit selected from the group consisting of divinylbenzene and para-methylstyrene.

Preferably, the terpolymer of the present invention has a weight-average molecular weight of 80,000-170,000. In a specific embodiment, the terpolymer of the present invention has a weight-average molecular weight of 84,000-161,900.

The terpolymer of the present invention preferably has a number-average molecular weight of 10,000-100,000, and more preferably 20,000-80,000.

As used herein, the term "glass transition temperature" means the temperature at which the terpolymer changes from a solid state to a flowable liquid state and the crystalline portion of the terpolymer starts to flow. In less-crystalline resins, unlike crystalline resins, glass transition temperature is used instead of melting temperature. The less-crystalline resins show a brittle mode below their glass transition temperature, but show a ductile mode above their glass transition temperature.

The terpolymer of the present invention has a very low glass transition temperature between −20° C. and −60° C., and thus shows the ductile mode not only at room temperature, but also at a temperature as low as 0° C., and has excellent elastomeric characteristics.

Preferably, the terpolymer of the present invention has a molecular weight distribution of 1-3.5.

As used herein, the term "molecular weight distribution" refers to the ratio of weight-average molecular weight (Mw) to number-average molecular weight (Mn).

Generally, polymers have a broad range of molecular weight distribution from low molecular weight to high molecular weight. A molecular weight distribution which is broad with average molecular weight is referred to as "broad molecular weight distribution" (board MWD), and as the molecular weight distribution of a polymer broadens and the shear rate decreases, the viscosity is decreased to improve the processability, but the strength is decreased. On the contrary, a molecular weight distribution which is narrow with average molecular weight is referred to as "narrow molecular weight distribution" (narrow MWD), and in this case, the strength of a polymer is increased, but the processability is reduced.

The terpolymer of the present invention shows a relatively narrow molecular weight distribution of 1-3.5, and thus has increased strength.

Methods for measuring the molecular weight distribution of the terpolymer according to the present invention include a precipitation method, an ultracentrifugation method, a column separation method and a GPC (gel permeation chromatography) method. In addition, a simple method such as a stress exponent (S. Ex) method may be used. In the stress exponent method, based on the relationship between melt index and molecular weight distribution, melt index is measured, and then molecular weight distribution is determined.

The highly elastic, ethylene-based terpolymer of the present invention preferably has a tangent delta (Tan δ) of 0.1-0.5.

As used herein, the term "Tan δ" (tangent delta) refers to the ratio of loss modulus to storage modulus and is used to measure the viscoelastic properties of polymers.

The terpolymer of the present invention has a Tan δ of 0.1-0.5, suggesting that it has excellent elastic properties.

In the present invention, the Tan δ value can be obtained by measuring each of storage modulus and loss modulus by dynamic mechanical analysis and calculating the ratio of the loss modulus to the storage modulus.

The terpolymer of the present invention has a high weight-average molecular weight, a low glass transition temperature, a relatively narrow molecular weight distribution and a relatively low Tan δ, suggesting that it has excellent strength and excellent elasticity properties. Owing to the above properties, the terpolymer of the present invention can be applied to various component materials, which require elasticity, in various fields, including automobiles, footwear, adhesives, sealants, coating, electric wire and cable jackets, medical supplies and systems.

The present invention also provides a method for preparing a highly elastic, ethylene-based terpolymer, the method comprising the following step:

1) polymerizing 60-95 mole % of an ethylene monomer, 3-35 mole % of a $C_{6-12}$ α-olefin monomer and 0.5-5 mole % of at least one functional monomer selected from the group consisting of divinylbenzene and para-methylstyrene, using a metallocene catalyst (step 1).

Step 1) is a step of polymerizing 60-95 mole % of an ethylene monomer, 3-35 mole % of a $C_{1-6}$ α-olefin monomer and 0.5-5 mole % of at least one functional monomer selected from the group consisting of divinylbenzene and para-methylstyrene using a metallocene catalyst. In this step, the ethylene monomer, the $C_{6-12}$ α-olefin monomer and the functional monomer are polymerized at a specific ratio, thereby preparing a highly elastic, ethylene-based terpolymer consisting of ethylene/$C_{6-12}$ α-olefin/functional monomers.

The $C_{6-12}$ α-olefin monomer and the at least one functional monomer selected from the group consisting of divinylbenzene and para-methylstyrene are as described above with respect to the $C_{6-12}$ α-olefin monomer and the at least one functional monomer selected from the group consisting of divinylbenzene and para-methylstyrene, regarding the highly elastic, ethylene-based terpolymer.

In the present invention, the catalyst that is used for the copolymerization of the ethylene monomer, the $C_{6-12}$ α-olefin monomer and the functional monomer is a metallocene catalyst which is a coordinated anionic catalyst.

In the present invention, the metallocene catalyst comprises a Group 4 transition metal as a chiral metal, and cyclopentadienyl or its derivative, fluorenyl or its derivative, or indenyl or its derivative as a ligand. Also, the metallocene catalyst has a bridged (ansa) structure or a non-bridged structure.

In view of catalytic activity, the metallocene catalyst preferably comprises Ti or Zr as a chiral metal, and indenyl or its derivative as a ligand, and has a bridged (ansa) structure.

As used herein, the term "catalytic activity" refers to a value obtained by dividing the yield (kg) of a polymer resulting from metallocene catalysis by μmol of the catalyst and time (hr).

In the present invention, the catalytic activity in polymerization is 2500 or higher, and preferably 2500-5000.

In the present invention, non-polymerized monomer and a solvent, if any, can be removed either by vacuum distillation or by contact with alumina, silica or molecular sieve. In addition, impurities can be removed using a trialkyl aluminum compound, an alkali metal, a metal alloy (e.g., Na/K) or the like.

The metallocene catalyst that is used in the present invention may be, for example, ethyl bis(indenyl)zirconium dichloride, but is not limited thereto.

The metallocene catalyst is preferably used together with an alkylaluminoxane cocatalyst, an organic aluminum cocatalyst, a boron compound cocatalyst, or a mixture thereof The alkylaluminoxane cocatalyst is selected from the group consisting of methylaluminoxane, ethylaluminoxane, propylaluminoxane, butylaluminoxane and isobutylaluminoxane.

The organic alkyl aluminum cocatalyst is selected from the group consisting of trimethylaluminum, triethylaluminum and diisobutylaluminum chloride.

The boron compound cocatalyst is selected from the group consisting of tris(pentafluorophenyl)borane, N,N-dimethylanilinium tetrakis(pentafluorophenyl)borate and triphenylmethylinium tetrakis(pentafluorophenyliborate.

In the present invention, the polymerization is preferably carried out at a temperature of 20° C. or higher, and more preferably 20 to 40° C. If the polymerization is carried out at a temperature lower than the lower limit of the above range, catalytic activity will be rapidly reduced and a copolymer having low molecular weight will be produced.

In the present invention, the polymerization is preferably carried out for 20 minutes to 1 hour. If the polymerization is carried out for a time shorter than the lower limit of the above range, catalytic activity will be reduced and a copolymer having low molecular weight will be produced, and if the polymerization is carried out for a time longer than the upper limit of the above range, the content of ethylene in the resulting terpolymer will increase to a very high level so that the elasticity of the terpolymer will be reduced. For these reasons, the polymerization time is an important factor that should be suitably controlled to improve the efficiency of preparation of the highly elastic, ethylene-based terpolymer and the properties of the terpolymer.

According to the inventive method for preparing the highly elastic, ethylene-based terpolymer, a highly elastic, ethylene-based terpolymer having a high weight-average molecular weight and a low glass transition temperature can be easily prepared under mild conditions without using expensive reagents. Thus, the inventive preparation method is preferable in economic terms.

Advantageous Effects

According to the present invention, a highly elastic, ethylene-based terpolymer can be prepared by polymerizing a specific molar ratio of an ethylene monomer, a $C_{6-12}$ α-olefin monomer and at least one functional monomer selected from the group consisting of divinylbenzene and para-methylstyrene using a metallocene catalyst. The terpolymer has excellent properties, including high elasticity and excellent mechanical strength, and thus can be applied to various component materials, which require elasticity, in various fields, including automobiles, footwear, adhesives, sealants, coating, electric wire and cable jackets, medical supplies and systems.

Mode for Invention

Hereinafter, the present invention will be described in detail with reference to examples. It is to be understood, however, that these examples are for illustrative purposes only and are not intended to limit the scope of the present invention.

EXAMPLES 1 to 8

Preparation of terpolymers of the Present Invention

To a 100-ml glass reactor equipped with a stirrer, toluene, ethylene, α-olefin (hexene or decene) and a functional monomer (divinylbenzene or para-methylstyrene) were added at room temperature at the ratio shown in Table 1 below. The amount of toluene added was adjusted such that the total volume of toluene, ethylene, α-olefin (hexene or decene) and the functional monomer (divinylbenzene or para-methylstyrene) reached 30 ml. After the temperature of the reactor has been controlled at 30° C., 5 μmol of ethyl bis(indenyl)zirconium dichloride $(Et(Ind)_2ZrCl_2)$ as a catalyst and a 2000-fold molar amount (relative to the molar amount of the catalyst) of methylaluminoxane as a cocatalyst were dissolved in toluene and added to the reactor, and the monomers were polymerized at 30° C. for 60 minutes. After 60 minutes, small amounts of methanol and hydrochloric acid were added to terminate the polymerization. The reaction product was separates and dried under reduced pressure at 60° C. for 6 hours, thereby obtaining a terpolymer.

TABLE 1

| | Monomer components (mole %) | | | | |
|---|---|---|---|---|---|
| | Ethylene | Hexene | Decene | Divinyl-benzene | Para-methylstyrene |
| Example 1 | 94 | 0 | 5.2 | 0 | 0.8 |
| Example 2 | 90 | 0 | 9.1 | 0 | 0.9 |
| Example 3 | 85 | 0 | 13.8 | 0 | 1.2 |
| Example 4 | 81 | 0 | 17.8 | 0 | 1.2 |
| Example 5 | 95 | 4.3 | 0 | 0.7 | 0 |
| Example 6 | 92 | 7.1 | 0 | 0.9 | 0 |
| Example 7 | 86 | 13 | 0 | 1.0 | 0 |
| Example 8 | 82 | 17 | 0 | 1.0 | 0 |

Comparative Examples 1 and 2

Preparation of terpolymers of Comparative Examples

Terpolymers were prepared in the same manner as Examples 1 to 8, except that the monomers were added at the ratio shown in Table 2 below and were polymerized for the time shown in Table 2.

TABLE 2

|  | Monomer components (mole %) | | | | | Polymerization |
|---|---|---|---|---|---|---|
|  | Ethylene | Hexene | Decene | Divinylbenzene | Para-methylstyrene | time (min) |
| Comparative Example 1 | 92 | 7.1 | 0 | 0.9 | 0 | 15 |
| Comparative Example 2 | 89 | 0 | 5 | 0 | 6 | 60 |

Test Example 1

Comparison of Weight and Physical Properties between terpolymers of the Present Invention and terpolymers of Comparative Examples The weights and physical properties of the terpolymers prepared in Examples 1 to 8 of the present invention and the terpolymers prepared in Comparative Examples 1 and 2 were comparatively measured. The results of the measurement are shown in Table 3 below.

TABLE 3

|  | Catalytic activity | Mw (g/mol) | Mn (g/mol) | MWD | Tg (° C.) | Tan δ |
|---|---|---|---|---|---|---|
| Example 1 | 3100 | 114,500 | 54,000 | 2.11 | −24 | 0.4 |
| Example 2 | 4500 | 116,400 | 54,000 | 2.16 | −30 | 0.4 |
| Example 3 | 3240 | 107,000 | 47,000 | 2.23 | −35 | 0.3 |
| Example 4 | 2928 | 96,000 | 38,000 | 2.15 | −44 | 0.1 |
| Example 5 | 3240 | 161,500 | 73,500 | 2.31 | −27 | 0.3 |
| Example 6 | 3010 | 161,900 | 72,000 | 2.33 | −31 | 0.3 |
| Example 7 | 2590 | 159,000 | 64,400 | 2.41 | −34 | 0.2 |
| Example 8 | 2500 | 145,000 | 63,200 | 2.39 | −41 | 0.1 |
| Comparative Example 1 | 850 | 31,000 | 14,000 | 2.66 | −17 | 0.6 |
| Comparative Example 2 | 1020 | 40,100 | 17,900 | 2.59 | −15 | 0.6 |

As can be seen from the results in Table 3 above, the catalytic activity in the polymerization of the present invention was higher than that in the Comparative Examples, and the terpolymers prepared in the present invention had a significantly high weight-average molecular weight and a narrow molecular weight distribution compared to the terpolymers prepared in the Comparative Examples, suggesting that a highly uniform terpolymer can be prepared according to the present invention. In addition, the terpolymers of the present invention had a low glass transition temperature and a low Tan δ value compared to the terpolymers of the Comparative Examples, suggesting that the terpolymers of the present invention have excellent elastic properties. On the contrary, it could be seen that, in the case of the Comparative Examples in which the polymerization time was shorter than 20 minutes or the amount of the functional monomer was more than 5 mole %, the catalytic activity and the molecular weight of the terpolymer were significantly reduced and the elasticity of the terpolymer was also reduced.

The invention claimed is:

1. A highly elastic, ethylene-based terpolymer comprising 80-95 mole % of an ethylene unit,
4-18 mole % of a $C_{6-12}$ α-olefin unit, and
0.5-2 mole % of para-methylstyrene,
the ethylene-based terpolymer having a weight-average molecular weight of 50,000-200,000, a glass transition temperature between −20° C. and −60° C. and a Tan δ of 0.1-0.5.

2. The highly elastic, ethylene-based terpolymer of claim 1, wherein the terpolymer has a molecular weight distribution of 1-3.5.

3. A method for preparing the highly elastic, ethylene-based terpolymer of claim 1, the method comprising a step of polymerizing 80-95 mole % of an ethylene unit, 4-18 mole % of a $C_{6-12}$ α-olefin unit and 0.5-2 mole % of para-methylstyrene using a metallocene catalyst.

4. The method of claim 3, wherein the metallocene catalyst comprises a group 4 transition metal as a chiral metal, and cyclopentadienyl or its derivative, fluorenyl or its derivative, or indenyl or its derivative as a ligand, and has a bridged (ansa) structure or a non-bridged structure.

5. The method of claim 4, wherein the metallocene catalyst is ethyl bis(indenyl)zirconium dichloride.

6. The method of claim 3, wherein catalytic activity in the polymerization is 2500-5000.

7. The method of claim 3, wherein the metallocene catalyst is used together with an alkylaluminoxane cocatalyst, an organic aluminum cocatalyst, a boron compound cocatalyst, or a mixture thereof.

8. The method of claim 7, wherein the alkylaluminoxane cocatalyst is selected from the group consisting of methylaluminoxane, ethylaluminoxane, propylaluminoxane, butylaluminoxane and isobutylaluminoxane; the organic alkyl aluminum cocatalyst is selected from the group consisting of trimethylaluminum, triethylaluminum and diisobutylaluminum chloride; and the boron compound cocatalyst is selected from the group consisting of tris(pentafluorophenyl)borane, N,N-dimethylanilinium tetrakis(pentafluorophenyl)borate and triphenylmethylinium tetrakis(pentafluorophenyl)borate.

9. The method of claim 3, wherein the polymerization is carried out at a temperature of 20 to 40° C.

10. The method of claim 3, wherein the polymerization is carried out for 20 minutes to 1 hour.

* * * * *